Figure 1:
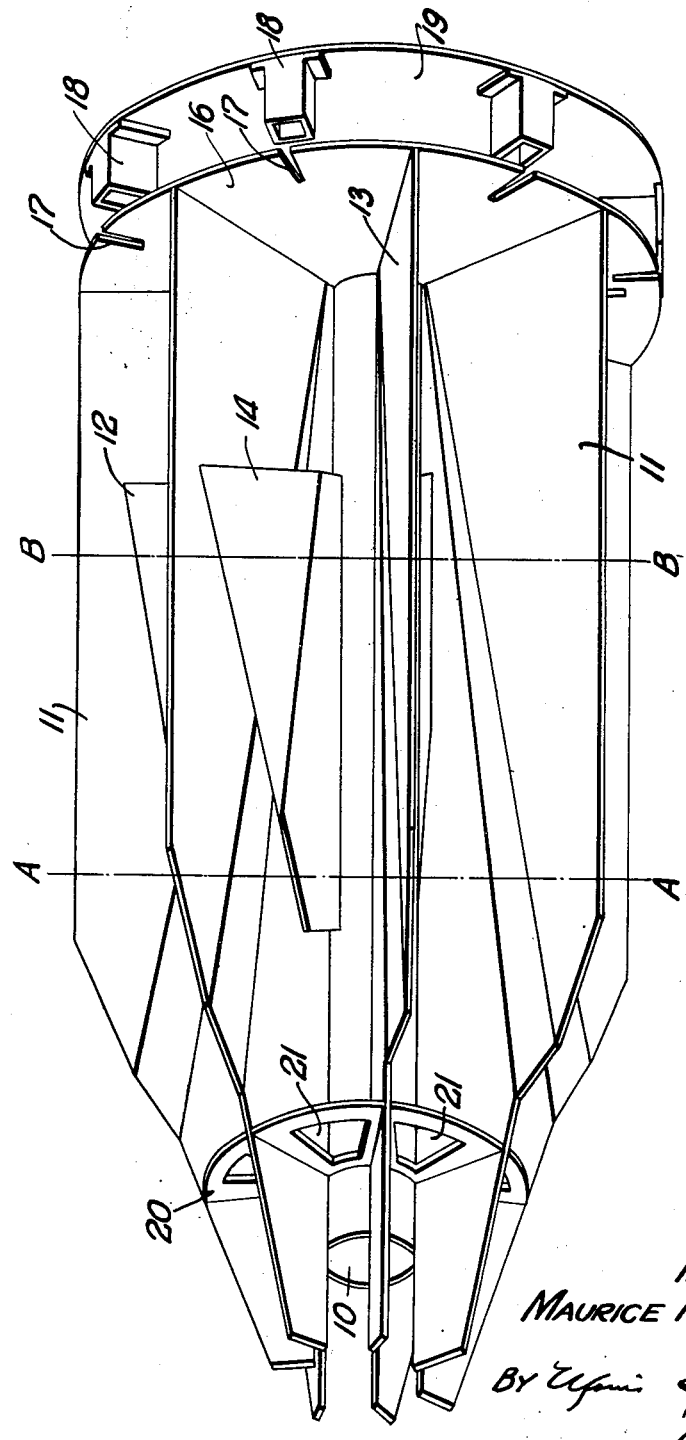

July 25, 1950 M. M. LEVY 2,516,221
MODULATOR FOR MULTICHANNEL SIGNALING SYSTEMS
Filed Oct. 21, 1948 2 Sheets-Sheet 1

INVENTOR:
MAURICE MOISE LEVY
BY
ATTORNEY

July 25, 1950  M. M. LEVY  2,516,221
MODULATOR FOR MULTICHANNEL SIGNALING SYSTEMS
Filed Oct. 21, 1948  2 Sheets-Sheet 2

INVENTOR
MAURICE MOISE LEVY
BY
ATTORNEY

Patented July 25, 1950

2,516,221

UNITED STATES PATENT OFFICE 2,516,221

MODULATOR FOR MULTICHANNEL SIGNALING SYSTEMS

Maurice Moise Levy, Earls Court, England, assignor to The General Electric Company, Limited, London, England Application October 21, 1948, Serial No. 55,735
In Great Britain July 11, 1947

11 Claims. (Cl. 332—40)

The present invention relates to modulators for multi-channel signalling systems, the modulators being of the kind suitable for use in producing time or phase modulation of recurrent pulses in systems in which the pulses of one channel are interleaved with the pulses of one or more channels.

A known form of modulator of this kind employs a cathode ray tube having within it a screen arranged normally with respect to the mean direction of the cathode ray beam, the beam being deflected to sweep in a circular path over the screen. In the path of the beam are elongated apertures inclined relatively to the tangents to the path. A collector electrode is arranged on the side of the screen away from the source of the cathode rays to collect electrons which pass through the apertures. Each aperture has associated with it a pair deflecting electrodes (one of which may be common to all apertures) for deflecting the beam radially with respect to its circular path, thus causing it to follow a path of greater or smaller radius according to the instantaneous value of the voltage applied between the deflecting electrodes. This voltage is the modulating voltage. Owing to the inclination of the apertures, the effect of the modulating voltage is to cause the electrons from the beam to pass through any aperture earlier or later than in the absence of such voltage and so produce the desired time or phase modulation. Each aperture with its associated deflecting means operates in conjunction with a different channel. Negative pulses may be obtained from the collector electrode or positive pulses may, if preferred, be obtained from the screen.

This known modulator has certain disadvantages. The positions and inclinations of the apertures must be arranged with considerable precision and the apertured screen is, therefore, relatively difficult to produce.

As the beam sweeps into the space between the deflecting electrodes it passes through a region where owing to edge effect the electric field is not uniform. This tends to produce defocussing and can be avoided only by making the arc, covered by each pair of deflecting electrodes, sufficiently greater than the subtense of the corresponding apertures, which necessitates a greater aperture spacing and this results in a more bulky tube than would otherwise be required.

The mean radius of rotation of the beam over the apertured screen must be given, and maintained at, a suitable fixed value.

The present invention has for its principal object to provide a novel form of modulator of the kind set forth in which the above-mentioned disadvantages are substantially reduced or eliminated.

According to this invention, a modulator of the kind set forth comprises a cathode ray tube device including a screen arranged substantially normally with respect to the mean direction of the cathode ray beam and having therein elongated apertures which are radial with respect to the said mean direction, means for deflecting the beam in a circular path over the apertures and, associated with each aperture, two modulator electrodes whereby the beam can be deflected in a direction tangential with respect to the circular path.

In this case, as in the known modulator referred to, negative pulses may be derived from a collector electrode adapted to receive electrons which pass through the apertures and positive pulses may be derived from the screen. By the use of secondary emission pulses of opposite polarities can be obtained.

Figures 2, 3:
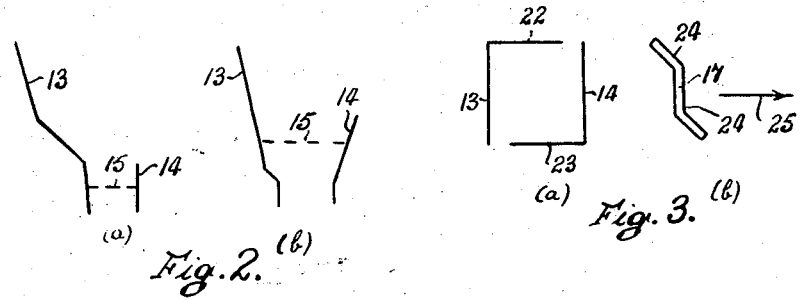
Figure 4:
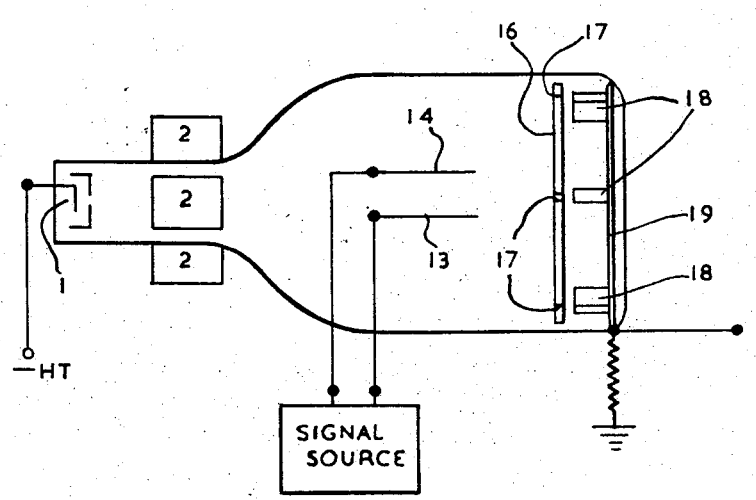

The invention will be described by way of example with reference to the accompanying drawing in which:

Figure 1 is a perspective view of an electrode assembly for a modulator according to the invention, Figure 2 shows at (a) and (b), respectively, the approximate cross-sectional shapes of deflecting electrodes at A—A and B—B in Figure 1, Figure 3 shows at (a), (b), respectively, a pair of co-operating electrodes of modified cross-sectional shape and a modified aperture shape, and Figure 4 is a diagrammatic representation of a cathode ray tube, which may embody the electrode assembly of Figure 1, and circuit connections therefor, only one pair of tangential deflecting electrodes being shown diagrammatically.

Referring first to Figure 4, an electron beam from a cathode 1 is caused by deflecting coils 2 to sweep in a circular track over a metal disc 16 having elongated apertures 17 radial with respect to the mean direction of the cathode ray beam and hence the tube axis. Electrons which pass through the apertures 17 are collected in buckets 18 carried on a plate 19 which may be insulating or conducting: if insulating, the buckets are electrically connected together and through a resistor 3 to earth. The cathode 1 is connected to a suitable source of negative potential with respect to earth. Modulating signals are applied from a signal source 4 to deflecting plates 13, 14 serving to deflect the beam tangentially with respect to its circular track. In this way the instants at which the beam traverses any aperture 17 are advanced and retarded in accordance with the signal voltage. Modulated pulses are obtained at a terminal 5 and may be fed to a transmitter.

Referring to Figure 1, the electrode structure shown is mounted upon a central metal cylinder 10 and comprises screens 11 alternating with deflecting electrodes 12, the deflecting electrode 12 being insulated from the cylinder 10. The screen 13 co-operates with the deflecting electrode 14 and forms one pair of co-operating modulating electrodes. The approximate cross-sectional shapes of these electrodes at A—A and B—B are shown in Figure 2 (a) and (b) respectively, the track of the cathode ray beam being indicated at 15. The beam travels from left to right in Figure 1. The screens 11 are fixed at one end to the disc 16.

A metal mask 20 is connected to the central cylinder 10 and to the screens 11 and has apertures 21 of such size as to prevent the beam from striking the modulating electrodes. The modulating electrodes are also shaped to prevent their being stuck by the electrons.

In an alternative form of the invention, which is basically the equivalent of that above set forth, the apertured screen 16 is replaced by a member having projecting conducting arms in place of the apertures. Electrons then reach the collecting means 18 excepting when prevented from doing so by the radial arms. In this case negative pulses can be derived from the radial arms or positive pulses from the collecting means.

The effect of modulating voltages applied to the deflecting electrodes, in either case, is to accelerate or decelerate the beam in its circular track and hence to cause it to reach an aperture (or a radial arm) earlier or later than in the absence of such voltages and so, as before, produce pulses which are time or phase modulated in accordance with the modulating voltages.

The deflecting electrodes are preferably so shaped (as will be seen from Figure 2 (a) and (b)) that over a substantial part thereof lying on either side of the path of the beam between its source and the screen 16 they are parallel to one another in planes transverse with respect to the electrodes and with respect to the tube axis. Parts of the electrodes which are nearer and/or further from the axis of the tube than the parallel part may be approximately radial with respect to the axis of the tube. On the other hand it may be found necessary to depart from this arrangement and to provide some inclination (usually a slight divergence proceeding outwards from the tube axis) between the electrodes over the parts thereof lying in the path of the beam in order that electrons of different velocities, which are therefore deflected to different extents by the deflecting means causing the beam to move in a conical path, may be substantially equally deflected by the voltages applied to the modulating deflecting electrodes. Modifications may also be made to the shape of these electrodes to compensate for other distortions of the electron-optrical system and for reasons of mechanical design. The electrodes may diverge in the direction of travel of the beam.

It is desirable, for the sake of high sensitivity, that the modulating deflecting electrodes should be as close to the source of the electrons as practicable. However, the cross-section of the beam increases as the source is approached and, in addition for a given number of pairs of deflecting electrodes, the distance between the electrodes of each pair decreases as the source is approached. If the beam cross-section is unduly large in relation to the distance between the electrodes distortion of the cross-section will occur. The cross-sectional dimensions of the beam at the region where it traverses the modulating deflecting electrodes is, therefore, made small compared with the distance between the electrodes. In order to assist the achieving of this result, instead of arranging that each pair of co-operating electrodes diverges in the direction of travel of the beam, as above described, they may be made parallel or nearly parallel to one another at least over the part of their length (in the direction of the beam) nearer the beam source. Further from the source they may diverge sufficiently to conform to the path of the beam in its extreme positions of deflection.

The mask 20 is arranged to intercept the beam until it has reached a point in its travel such that with maximum or minimum deflection in both senses, the beam just fails to strike the electrodes. Alternatively, or in addition, the beam may be modulated by suitable oscillations preferably of rectangular wave form in such a manner that the beam is not switched on until it has reached a point at which it cannot strike the first of each pair of electrodes and such that the beam is switched off in time to prevent it striking the second of each pair of electrodes.

In the known form of modulator tube already referred to, the inclined apertures usually merge at each end into a portion which is radial with respect to the circular path of the beam. These radial portions ensure that if the modulating voltage should be excessive pulses are still generated, although their modulation will of course be distorted owing to the portions being radial instead of inclined.

For the same purpose, in the present invention, means may be provided for ensuring that even with excessive modulation the beam does not fail to strike the radial aperture or arm. For this purpose, as shown diagrammatically in Figure 3 (a), the two deflecting plates 13, 14 of each pair by which the beam is modulated may be provided with circumferential, or tangential portions 22 and 23 respectively extending towards the other electrode of the pair, thus forming a partly closed frame around the path of the beam. The radial apertures 17 may, as shown in Figure 3 (b), merge at each end into an inclined portion 24, the inclined portions being usually parallel to one another. The effect is that when the modulating voltage is excessive the beam, moving in the direction of the arrow 25, is forced out of its normal path of constant radius into a path of larger or smaller radius, as the case may be, and can pass through the outer or inner inclined extension. A corresponding arrangement can also be provided when radial arms are used instead of apertures.

The screen structure employed in this invention is simpler to make since the normally operative parts of the apertures (or the arms) are radial. The inclined parts 24, when provided, do not need to be formed with accuracy since they come into action only when modulation is excessive and distortion must not occur in any case.

The beam can be arranged to be in a uniform deflecting field throughout the most important part of its track where the deflecting plates can be made parallel. Before and after the parallel portion the beam may, as described, be arranged to pass through flared portions when the deflecting field is lower and consequently the edge effect is less important than in the known arrangement referred to. Defocussing can therefore be made substantially less than in the known arrangement.

Moreover the radius of rotation of the beam is not critical since the apertures (or arms) are radial.

I claim:

1. A modulator for producing interlaced trains of recurrent pulses each train being modulated in accordance with a channel signal, said modulator comprising a cathode ray tube, a screen disposed substantially normally with respect to the mean direction of the cathode ray beam of said tube, electron-collecting means, means for selectively controlling the passage of electrons from said beam to said collecting means over a plurality of narrow elongated zones radial with respect to said means direction, means for deflecting said beam in a circular track over said zones, and associated with each of said zones two modulator electrodes for the application of said channel signal disposed to deflect the cathode ray beam in a direction tangential with respect to said track.

2. A modulator according to claim 1, wherein said screen is apertured radially with respect to said mean direction to permit electrons to pass to said collecting means only over said zones.

3. A modulator according to claim 1, wherein said controlling means comprise a plurality of conductors disposed to prevent passage of electrons to said collecting means over said zones.

4. A modulator according to claim 1, wherein each said two modulating electrodes have portions swept over by said beam whose cross sections in planes transverse with respect to said mean direction are substantially parallel to one another.

5. A modulator according to claim 4, wherein said portions are at the ends of said electrodes nearer the source of said beam.

6. A modulator according to claim 4, wherein said portions are at the ends of said electrodes nearer the source of said beam, further portions of said electrodes more remote from said source flaring away from one another in a direction away from said mean direction.

7. A modulator according to claim 1, wherein each said two modulating electrodes have portions substantially parallel to one another in a direction along the path of said beam from the source thereof.

8. A modulator for producing interlaced trains of recurrent pulses each train being modulated in accordance with a channel signal, said modulator comprising a cathode ray tube, a screen disposed substantially normally with respect to the mean direction of the cathode ray beam of said tube, electron-collecting means, means for selectively controlling the passage of electrons from said beam to said collecting means over a plurality of narrow elongated zones radial with respect to said mean direction, means for deflecting said beam in a circular track over said zones, two modulator electrodes associated with each of said zones for the application of said channel signal, disposed to deflect the cathode ray beam in a direction tangential relatively to said track and a mask disposed on the side of said electrodes nearer the source of said beam and apertured to permit the passage of said beam but substantially to prevent said beam from striking said electrodes.

9. A modulator for producing interlaced trains of recurrent pulses each train being modulated in accordance with a channel signal, said modulator comprising a cathode ray tube, a screen disposed substantially normally with respect to the mean direction of the cathode ray beam of said tube, electron-collecting means, means for selectively controlling the passage of electrons from said beam to said collecting means over a plurality of narrow elongated zones radial with respect to said mean direction, means for deflecting said beam in a circular track over said zones, two modulator electrodes associated with each of said zones, disposed to accelerate and decelerate said beam along said track and means for applying one of said channel signals to each said two electrodes.

10. A modulator for producing interlaced trains of recurrent pulses each train being modulated in accordance with a channel signal, said modulator comprising a cathode ray tube, a screen disposed substantially normally with respect to the mean direction of the cathode ray beam of said tube, electron-collecting means, means for selectively controlling the passage of electrons from said beam to said collecting means over a plurality of narrow elongated zones radial with respect to said mean direction, means for deflecting said beam in a circular track over said zones, two modulator electrodes associated with each of said zones, disposed to accelerate and decelerate said beam along said track, means for applying one of said channel signals to each said two electrodes and means substantially to prevent electrons from said beam from striking said electrodes.

11. A modulator according to claim 9, wherein each of said two modulating electrodes is provided with a portion connected thereto and extending towards the other of said two modulating electrodes, one of said portions projecting from the radially outer edge of one of the electrodes and the other of said portions projecting from the radially inner edge of the other of the electrodes, and wherein each of said controlling means merges at each end thereof into a part inclined relatively to the radial direction to reduce risk of failure of said beam to strike said controlling means with excessive modulation.

MAURICE MOÏSE LEVY.

REFERENCES CITED

The following references are of record in the file of this patent:

UNITED STATES PATENTS

| Number | Name | Date |
| --- | --- | --- |
| 2,429,631 | Labin et al. | Oct. 28, 1947 |